(12) United States Patent
Kim et al.

(10) Patent No.: US 6,801,121 B2
(45) Date of Patent: Oct. 5, 2004

(54) PAGER HAVING SIMULTANEOUS MULTICHANNEL SCANNING FUNCTION AND DATA TRANSMITTING/RECEIVING METHOD THEREOF

(75) Inventors: Hyun Wook Kim, Kyunggi-do (KR); Sung Hee Seo, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 366 days.

(21) Appl. No.: 10/011,985

(22) Filed: Dec. 11, 2001

(65) Prior Publication Data

US 2002/0054652 A1 May 9, 2002

Related U.S. Application Data

(63) Continuation of application No. PCT/KR01/00627, filed on Apr. 16, 2001.

(30) Foreign Application Priority Data

Apr. 15, 2000 (KR) .......................................... 2000-19783

(51) Int. Cl.[7] .............................. G08B 5/22; H04Q 1/30; H04Q 7/00
(52) U.S. Cl. ........................ 340/7.1; 340/7.22; 340/7.42
(58) Field of Search ........................ 340/7.1, 7.22–7.29, 340/7.42, 7.46, 10.32; 375/260, 136, 140, 350, 347; 345/156; 370/330

(56) References Cited

U.S. PATENT DOCUMENTS

| | | | | |
|---|---|---|---|---|
| 4,734,694 A | * | 3/1988 | Umetsu et al. | 340/7.33 |
| 4,914,649 A | * | 4/1990 | Schwendeman et al. | 370/311 |
| 5,323,391 A | | 6/1994 | Harrison | 370/70 |
| 5,809,398 A | * | 9/1998 | Moberg et al. | 455/17 |
| 5,818,883 A | * | 10/1998 | Smith et al. | 375/347 |
| 6,057,783 A | * | 5/2000 | Kido | 340/7.42 |
| 6,323,784 B1 | * | 11/2001 | Miyashita | 340/7.2 |
| 6,510,313 B1 | * | 1/2003 | Rapeli | 455/323 |
| 6,515,577 B1 | * | 2/2003 | Ong et al. | 340/7.43 |
| 6,615,021 B1 | * | 9/2003 | Lovinggood et al. | 455/11.1 |

FOREIGN PATENT DOCUMENTS

| | | |
|---|---|---|
| JP | 08-214010 A | 8/1996 |
| JP | 09-51301 A | 2/1997 |
| KR | 2000-8899 A | 2/2000 |

* cited by examiner

Primary Examiner—Michael Horabik
Assistant Examiner—Nam V Nguyen
(74) Attorney, Agent, or Firm—Bacon & Thomas, PLLC

(57) ABSTRACT

A paging system separately transmits high capacity data through at least two paging channels of limited transmission rates in order to provide the high capacity data in real-time. A pager receives and processes the paging frequency signal transmitted through at least two channels, thereby generating regenerated data not to be separated.

5 Claims, 3 Drawing Sheets

PAGER HAVING SIMULTANEOUS MULTICHANNEL SCANNING FUNCTION AND DATA TRANSMITTING/RECEIVING METHOD THEREOF

This application is a continuation of International Application PCT/KR01/00627, filed 16 Apr. 2001, of which the entire disclosure of the pending, prior application is hereby incorporated by reference. The International Application was filed in Korean but has been published in English.

FIELD OF THE INVENTION

The present invention relates to a beeper (namely, a pager); and, more particularly, to a pager having a simultaneous multichannel scanning function for receiving high capacity data separately transmitted through the multichannel and a method for transmitting and receiving the data.

BACKGROUND OF THE INVENTION

Recently, fast leaping developments in wireless mobile communication techniques such as cellular phone, personal communication service (PCS), personal digital assistant (PDA) and the like make the number of subscribers of a paging service rapidly decreased and such trend seems to be continued for some time to come. The marked decline of the number of the subscribers makes capacities of available channels assigned to the paging service latent and, accordingly, some schemes have been proposed to properly make use of the existing paging service system and the paging frequency assigned thereto. For example, various services of stock information service, sports information service, traffic information service and the like are provided by using the existing wireless resources.

However, paging service protocols are generally represented by a POCSAG (Post Office Code Standardization Advisory Group) mode and a FLEX mode, wherein the POCSAG mode is for an asynchronous transfer mode having a maximum transmission rate of 2.4 kbps, and the FLEX mode is for a synchronous transfer mode having a maximum transmission rate of 6.4 kbps, and thus paging channels assigned to the existing paging service system have major limitations in the transmission rate and/or the transmission capacity.

Therefore, due to the limitation of the transmission rate in the paging service system, it is troublesome to provide data of high capacity, e.g., stock information service, sports information service, traffic information service and the like in real-time. For instance, the limitation of the transmission rate in each channel of the paging service system makes it difficult to expand the use of the unused resources, i.e., paging frequency.

Thus, if a scheme in which a paging system can transmit the high capacity data through the channel of the limited transmission rate in real-time and a pager can receive and decode the high capacity data is developed, we can expect a wide use expansion of the paging frequency and the paging system, utilities of which have been rapidly degraded in recent years.

SUMMARY OF THE INVENTION

It is, therefore, a primary object of the present invention to provide a pager having a simultaneous multichannel scanning function for receiving and decoding high capacity data separately transmitted through at least two channels in real-time.

It is another object of the present invention to provide a method for transmitting and receiving data between a paging system for separately transmitting high capacity data through at least two channels and a pager for receiving and decoding the high capacity data transmitted through each channel in real-time.

In accordance with one aspect of the present invention, there is provided an apparatus for receiving data separately transmitted through N channels, N being a positive integer larger than one, each of which occupies a frequency band separated from one another, which comprises:

antenna for receiving a paging frequency signal from the N channels;

N signal processing means, coupled with the antenna, for detecting N separated data from the received paging frequency signal;

means for synthesizing the N separated data detected from the N signal processing means to regenerate data, from which the N separated data are generated; and means for presenting the regenerated data thereon.

In accordance with another aspect of the present invention, there is provided a method for separately transmitting and receiving data through N channels, N being a positive integer larger than one, each of which occupies a frequency band separated from one another, which comprises the steps of:

separating the data into N separated data and encoding the N separated data, wherein each of the N encoded data is modulated into a paging frequency signal corresponding to one of the N channels;

transmitting the paging frequency signal through the N channels;

receiving the paging frequency signal transmitted through the N channels;

detecting the N separated data from the received paging frequency signal;

synthesizing the N separated data to regenerate data, from which the N separated data are generated; and presenting the regenerated data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments in accordance with the present invention will be described in further detail with reference to accompanying drawings. When a paging system separately transmits high capacity data through multi-channel, e.g., at least two channels in order to provide the high capacity data as stock information service, sports information service, traffic information service and the like, the pager in accordance with the present invention receives and processes the separately transmitted high capacity data and then provides the processed data to subscribers in real-time.

Figure 1:
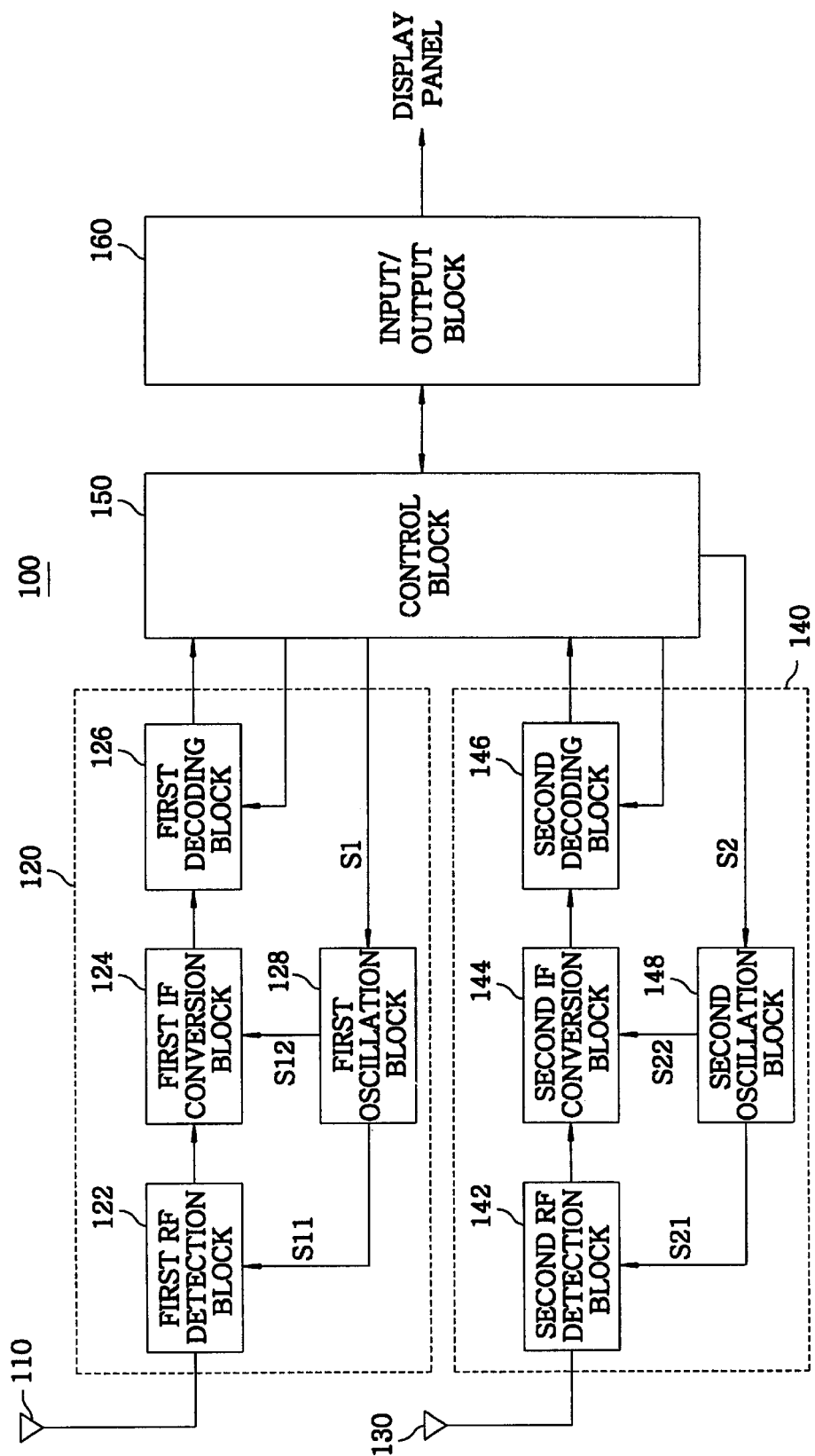
FIG. 1 shows a block diagram of a multi-channel detectable pager in accordance with a first preferred embodiment of the present invention.

FIG. 1 shows a block diagram of a pager having a simultaneously multichannel scanning function in accordance with a first preferred embodiment of the present invention. The first embodiment exemplifies a case where frequency signals are transmitted through, e.g., two channels whose frequency bands are not overlapped with each other. The pager 100 includes two antennas, a first antenna 110 and a second antenna 130, two signal processing blocks, a first signal processing block 120 and a second signal processing block 140, a control block 150 and an input/output block 160.

The first antenna 110 is a device for receiving a paging frequency signal air-emitted from the paging system (i.e., base station) not shown, and the paging frequency signal received by the first antenna 110 is transmitted to the first signal processing block 120.

The first signal processing block 120 has a first RF detection block 122, a first IF conversion block 124, a first decoding block 126 and a first oscillation block 128, and processes character data transmitted through a predetermined channel as follows.

First, the first RF detection block 122 tunes a frequency band of the frequency signal received by the first antenna 110 with a frequency band of a first oscillation signal S11 generated in the first oscillation block 128, thereby detecting an RF signal occupying a frequency band of the predetermined channel, e.g., a first channel, assigned to the pager 100.

Meanwhile, since the control block 150 uses frequency signals having a lower frequency band than the RF signal of a high frequency, the frequency band of the signal to be used in the control block 150 has to be shifted down. In order to shift down the frequency band of the signal to be used in the control block 150, the first IF conversion block 124, e.g., a down converter, converts the RF signal into an IF signal occupying a base band under a control of a second oscillation signal S12 generated in the first oscillation block 128.

Meanwhile, the pager 100 in accordance with the present invention stores a CAP code indicating an inherent address of its own in the first and the second decoding block 126 and 148 or the control block 150. The CAP code is an identification code for distinguishing the pager 100 from another pagers. The CAP code is determined for a wireless pager or a plurality of CAP codes may be determined according to the number of channels assigned to the pager 100.

The first decoding block 126 compares a first CAP code of the pager 100 with a CAP code put in the received signal. As a compared result, if the CAP code of the received signal is equal to the first CAP code, the first decoding block 126 examines a paging protocol of the received frequency signal transmitted through the first channel to decode the corresponding data and then deliver the decoded data to the control block 150; and if otherwise, the received frequency signal is discarded, and accordingly, the decoding process is not performed.

The first oscillation block 128 can be implemented by using, e.g., a PLL (Phase Locked Loop) to generate the first and the second oscillation signal S11 and S12 under a control of an oscillation control signal S1 provided from the control block 150. As stated above, the first oscillation signal S11 is sent to the first RF detection block 122 as a reference frequency signal for tuning and the second oscillation signal S12 is sent to the first IF conversion block 124, thereby controlling the frequency conversion process.

Meanwhile, the second antenna 130 also receives a paging frequency signal air-emitted from the paging system not shown and then delivers the received signal to the second signal processing block 140.

The second signal processing block 140 has a second RF detection block 142, a second IF conversion block 144, a second decoding block 146 and a second oscillation block 148. In the architecture, the second signal processing block 140 is practically equal to the first signal processing block 120, but receives and decodes the paging frequency signal transmitted through a second channel different from the first channel assigned to the first signal processing block 120 and then delivers the decoded signal to the control block 150.

That is, the second RF detection block 142 tunes a frequency band of the frequency signal received by the second antennal 130 with a frequency band of a third oscillation signal S21 generated in the second oscillation block 148, thereby detecting an RF signal occupying a frequency band of the second channel assigned to the pager 100, and the second IF conversion block 144 converts the detected RF signal into an IF signal of a base band under a control of a fourth oscillation signal S22 generated in the second oscillation block 148.

The second decoding block 146 also compares a second CAP code of the pager 100 with the CAP code of the received signal. As a result, if two CAP codes are identical to each other, the second decoding block 146 examines the paging protocol of the received frequency signal transmitted through the second channel, decodes the corresponding data and then delivers the decoded data to the control block 150; and if otherwise, the second decoding block 146 discards the received frequency signal and thus the received frequency signal is not decoded. Herein, the second CAP code is another CAP code distinguished from the first CAP code, but may be the same as the first CAP code. The decoded data is sent to the control block 150.

The second oscillation block 148 can be implemented by using, e.g., a PLL (Phase Locked Loop) to generate the third and the fourth oscillation signal S21 and S22 under a control of an oscillation control signal S2 generated in the control block 150. The third oscillation signal S21 is sent to the second RF detection block 142 as a reference frequency signal for tuning and the fourth oscillation signal S22 is sent to the second IF conversion block 144.

In order to detect the paging frequency signals transmitted through the first and the second channel assigned to the pager 100, the control block 150 including, e.g., a microprocessor for controlling overall operations of the pager 100 generates the oscillation control signals S1 and S2 corresponding to the paging frequency signal of the first and the second channel, and then provides the generated oscillation control signals S1 and S2 to the first and the second oscillation block 128 and 148, respectively.

The control block 150 also generates a sequence of character data by synthesizing the decoded data transmitted from the first and the second signal processing block 120 and 140, and then stores the character data in a memory not shown. The control block 150 presents the character data stored in the memory on a display panel (not shown) through the input/output block 160.

The input/output block 160 is connected to the display panel (e.g., LCD panel) for presenting the character data, a buzzer for notifying reception time of the character data and buttons being external devices processed by the control block 150, wherein such devices connected to the input/output block 160 are not shown.

As stated above, the pager 100 in accordance with the present invention receives and processes the character data separately transmitted through at least two paging channels in the signal processing blocks 120 and 140, each of which is prepared for respective channels, while the prior art pager receives and processes (RF detects, IF converts, decodes and the like) data transmitted through only one paging channel. Thus the high capacity data can be serviced in real-time.

Figure 2:
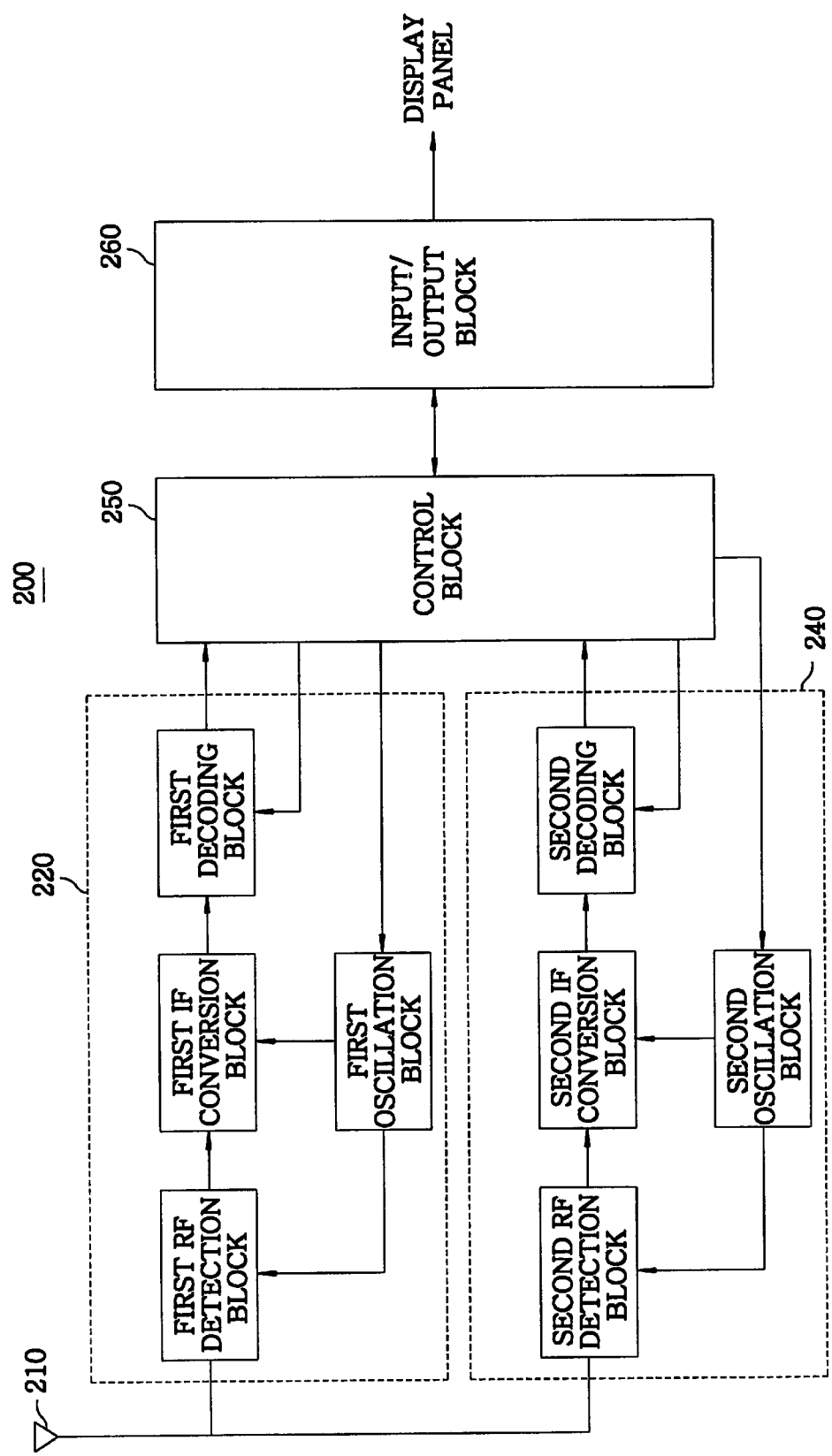
FIG. 2 depicts a block diagram of a multi-channel detectable pager in accordance with a second preferred embodiment of the present invention.

FIG. 2 depicts a block diagram of a pager having a simultaneous multichannel scanning function in accordance with a second preferred embodiment of the present invention. The second embodiment also describes a case where frequency signals are transmitted through, e.g., two channels whose frequency bands are not overlapped with each other. The pager 200 includes an antenna 210, two signal processing blocks 220 and 240, a control block 250 and an input/output block 260. The pager 200 in accordance with the present invention detects two channels by using a single antenna, differently from the pager 100 of FIG. 1. It may not be too much trouble to implement the pager 200. However, the pager 200 is used only when a frequency band of a received channel is near from a frequency band of the other and the pager 200 is useless in case where a frequency band of a received channel is not near from a frequency band of the other.

In the pager 200, the paging frequency signals received by the antenna 210 are simultaneously inputted to the first and the second signal processing block 220 and 240. Architectures and operations of the first and the second signal processing block 220 and 240 are practically identical to those of the first and the second signal processing block 120 and 140 of the first embodiment of FIG. 1. Therefore, for the simplicity of the explanation, the detailed explanation for the operations of the first and the second signal processing block 220 and 240 are omitted.

The same effects as obtained in the first embodiment can also be produced in the second embodiment. Further, the structure of the pager can be simplified since only one antenna is employed in the second embodiment.

Figure 3:
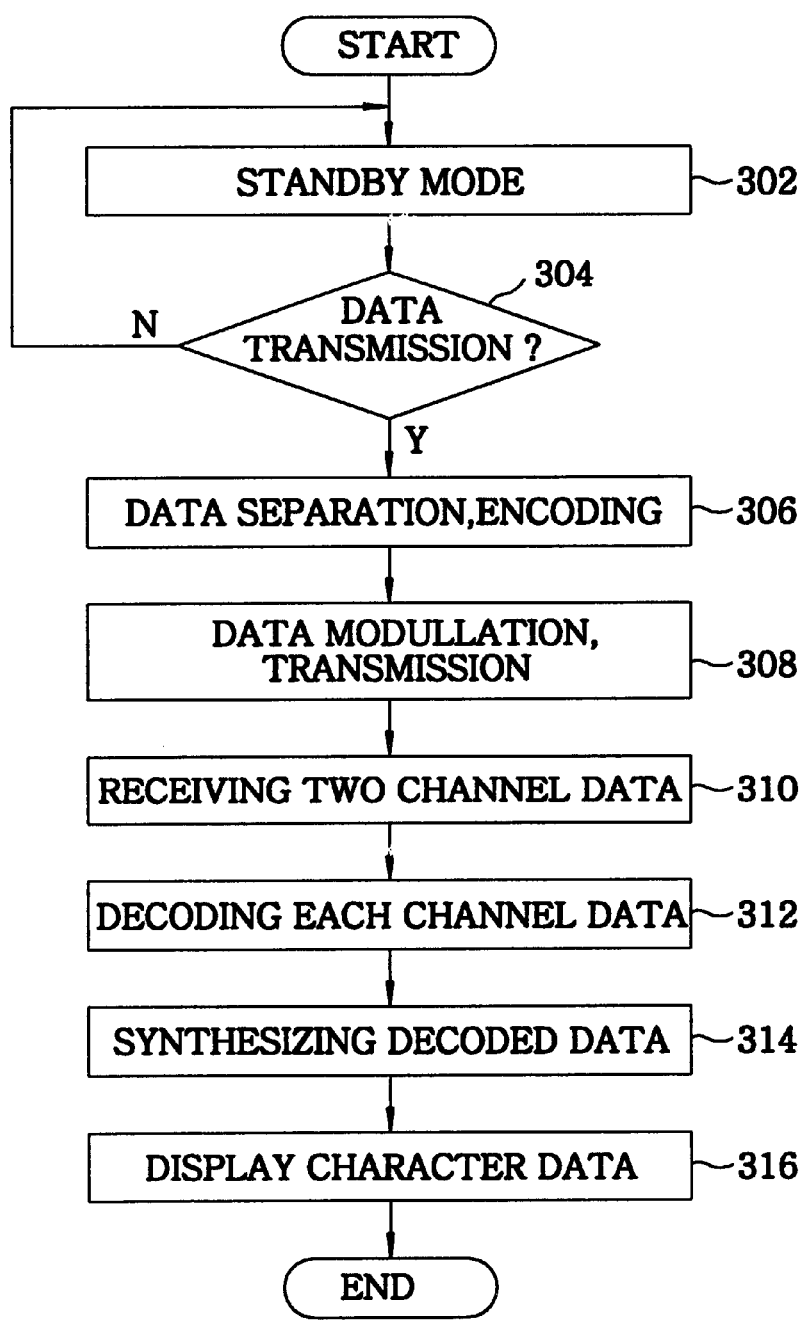
FIG. 3 is a flow chart of a procedure transmitting and receiving high capacity of information data through the multi-channel in accordance with the present invention.

FIG. 3 shows a procedure for transmitting and receiving high capacity data transmitted from a paging system to an inventive pager shown in FIGS. 1 and 2. For a simplicity of the explanation and an improvement of understanding, a case where the paging system separately transmits the high capacity data through two paging channels and the pager receives and decodes paging frequency signals transmitted through two channels by employing two signal processing circuits corresponding to each channel is explained with the reference to the pager 100 of FIG. 1.

First, the paging system not shown is in a standby mode (step 302) and checks whether the data to be transmitted to the pager 100 is present (step 304). As a checking result, if the character data to be transmitted is not present therein, the paging system maintains the standby mode and continuously checks whether or not character data to be transmitted is present. Meanwhile, as a checking result, if the data to be transmitted is determined to be present, the paging system separates the data, respectively encodes the separated data and modulates the encoded data (step 306) and then emits the modulated data through a transmission antenna (not shown) by loading the modulated data on carrier frequencies allotted to two paging channels (step 308).

Herein, assuming that the data to be transmitted is, e.g., stock information data, the data to be transmitted can be data automatically transmitted from the paging system to a service-registered pager or may be data (e.g., a bidirectional pager) requested by a corresponding pager (e.g., current market price data of a particular issue).

The first and the second antenna 110 and 130 of the pager 100 respectively receive frequency signals of the corresponding channels (step 310). The frequency signals received by the first and the second antenna 110 and 130 are respectively transmitted to the first and the second signal processing block 120 and 140, and then are subject to the RF detection process, the IF conversion process and the decoding process (step 312). At the moment, the control block 150 generates a first and a second oscillation control signal S1 and S2 corresponding to paging frequency signals of a first and a second channel, respectively and then provides the oscillation control signals S1 and S2 to the signal processing blocks 120 and 140, thereby detecting the paging frequency signals of the first and the second channel assigned to the pager 100, Next, the control block 150 synthesizes the decoded data transmitted from each of the signal processing blocks 120 and 140, and delivers the synthesized data to the input/output block 160 (step 314), and the input/output block 160 presents the transmitted synthesized data on a display panel (step 316).

Meanwhile, the inventive embodiments shown in FIGS. 1 to 3 describe that the high capacity data separately transmitted through two channels are received and processed. However, the inventive device may be designed to separately transmit and process the high capacity data through N channels as shown in drawings, N being a positive integer larger than one.

In accordance with the present invention, the paging system separately transmits high capacity data through a plurality of paging channels having limited transmission rates, and the pager can receive the high capacity data separately transmitted through multi-channel by employing a multiplicity of signal processing paths for respectively receiving and decoding the data transmitted through the multi-channel and means for synthesizing the decoded transmission data of each channel. Therefore, subscribers can enjoy services of high capacity data (e.g., stock information data, sports information data, traffic information data, and etc.) that the subscribers desire to be provided in real-time. Accordingly, the use of the paging frequency can be substantially expanded and the availability of the limited wireless resources can be increased.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for receiving data separately transmitted through N channels, N being a positive integer larger than one, each of which occupies a frequency band separated from one another, comprising:

antenna for receiving a paging frequency signal from the N channels;

N signal processing means, coupled with the antenna, for detecting N separated data from the paging frequency signal;

means for synthesizing the N separated data detected from the N signal processing means to regenerate data, from which the N separated data are generated; and means for presenting the regenerated data thereon and wherein each of the N signal processing means includes:

means for detecting a radio frequency (RF) signal corresponding to one of the N channels from the paging frequency signal;

means for converting the RF signal into an intermediate frequency (IF) signal by shifting down the frequency band of the RF signal; and means for detecting a pager identification code from the IF signal, comparing the detected pager identification code with a built-in identification code and, only if the detected pager identification code is equal to the built-in identification code, decoding the IF signal to detect one of the N separated data.

2. The apparatus of claim 1, wherein the number of the antenna is 1 and the antenna is connected to all N signal processing means.

3. The apparatus of claim 1, wherein N is 2.

4. A method for separately transmitting and receiving data through N channels, N being a positive integer larger than one, each of which occupies a frequency band separated from one another, which comprises the steps of:

separating the data into N separated data and encoding the N separated data, wherein each of the encoded data is modulated into a paging frequency signal corresponding to one of the N channels;

transmitting the paging frequency signal through the N channels; receiving the paging frequency signal transmitted through the N channels;

detecting the N separated data from the received paging frequency signal;

synthesizing the N separated data to regenerate data, from which the N separated data are generated; and presenting the regenerated data, wherein the detection step includes:

detecting an RF signal corresponding to each of the N channels from the paging frequency signal;

converting the RF signal into an IF signal by shifting down the frequency band of the RF signal corresponding to each of the N channels; and detecting a pager identification code from the IF signal corresponding to each of the N channels, comparing the detected pager identification code with a built-in identification code and, only if the detected pager identification code is equal to the built-in identification code, decoding the IF signal to detect one of the N separated data.

5. The method of claim 4, wherein N is 2.

* * * * *